United States Patent [19]
Bouwhuis et al.

[11] 4,132,959
[45] Jan. 2, 1979

[54] GAS DISCHARGE LASER HAVING AN ASYMMETRICAL COUPLING-OUT MIRROR

[75] Inventors: Gijsbertus Bouwhuis; Johannes van der Wal, both of Eindhoven, Netherlands

[73] Assignee: U.S. Philips Corporation, New York, N.Y.

[21] Appl. No.: 713,515

[22] Filed: Aug. 11, 1976

[30] Foreign Application Priority Data

Jun. 21, 1976 [NL] Netherlands .................. 7606693

[51] Int. Cl.$^2$ .............................................. H01S 3/00
[52] U.S. Cl. ...................... 331/94.5 C; 331/94.5 D; 331/94.5 T; 350/163; 350/164; 350/165
[58] Field of Search .................... 331/94.5 T, 94.5 D, 331/94.5 C; 350/163, 164, 166, 165

[56] References Cited

U.S. PATENT DOCUMENTS

| | | | |
|---|---|---|---|
| 3,569,858 | 3/1971 | Witteman | 331/94.5 |
| 3,649,359 | 3/1972 | Apfel | 117/33.3 |
| 4,009,453 | 2/1977 | Mahlein | 331/94.5 |

OTHER PUBLICATIONS

Laser Focus, vol. 5, No. 21, Nov. 1969, pp. 41–45.
Bouwhuis et al., Philips Tech. Rev., 33, No. 7, 1973, pp. 186–189.

Primary Examiner—Martin H. Edlow
Attorney, Agent, or Firm—Bernard Franzblau

[57] ABSTRACT

A gas discharge laser comprises a multilayer coupling-out mirror including a plurality of alternate dielectric layers of high (H) and low (L) indices of refraction. A radiation-attenuating film element, preferably a metal film, is sandwiched between a pair of L dielectric layers located near the mirror substrate to provide an asymmetrical characteristic whereby the laser becomes relatively insensitive to light reflected towards it, which in turn reduces any tendency toward fluctuation in the intensity of the laser beam. The device is especially useful in systems for reading out information from a video record carrier wherein the reflected light is modulated and if returned to the laser would produce output power fluctuations therein.

14 Claims, 4 Drawing Figures

S HL* M L* (HL)$^5$ H

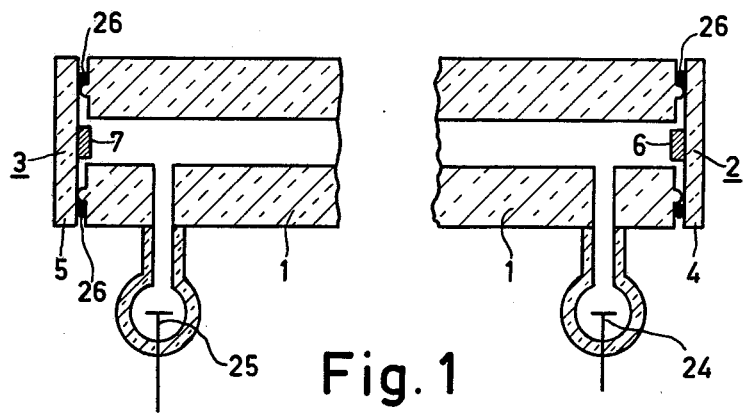
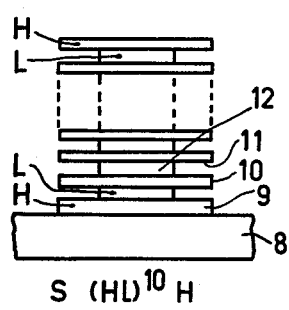
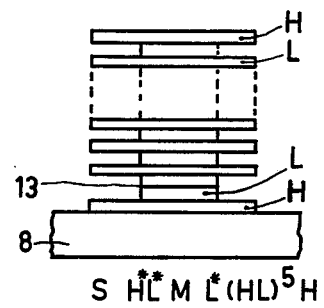
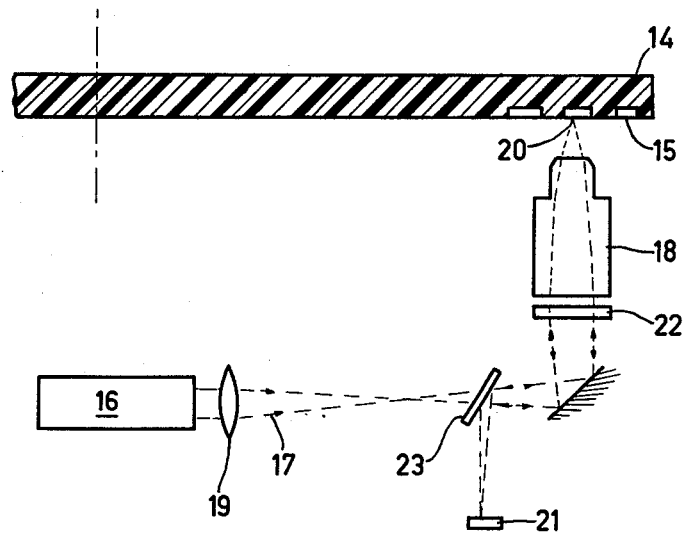

GAS DISCHARGE LASER HAVING AN ASYMMETRICAL COUPLING-OUT MIRROR

The invention relates to a gas discharge laser comprising a laser tube having a longitudinal bore which is sealed at either end and is filled with a gas in which an active laser medium is incorporated, said laser medium being activated in an optical resonator which is formed from at least two multi-layer mirrors. The multilayer mirrors are composed of a number of layers having a high and a low complex index of refraction formed on a substrate.

The invention also relates to a device for reading a record carrier on which information, for example video and/or audio information, is provided in an optically readable information structure, which device comprises a gas discharge laser of the kind mentioned in the first paragraph and a system of objective for supplying the laser beam via the record carrier to a radiation-sensitive detection system.

A gas discharge laser of the kind mentioned in the first paragraph is known from U.S. Pat. No. 3,986,141 which disclosed a He-Ne gas laser in which the multilayer mirrors are secured directly to the ends of the laser tube so that they also constitute the vacuum seal of the discharge space. The laser tube is connected to electrode spaces outside the laser tube by means of lateral tubes. In the laser tube a discharge between the electrodes is initiated by applying a potential difference between the electrodes, a laser beam being produced by stimulated emission.

Gas discharge lasers having a wide field of application. They are often used in measuring devices, for example, interferometers, and the like. They are also used in devices for reading record carriers on which information, for example video and/or audio information, is stored in an optically readable information structure. They form therein a monochromatic source of radiation which emits a light beam which impinges upon the record carrier and is reflected by same to a detection system. Such a device is described inter alia in the Philips' Technical Review 33, No. 7, 1973 pp. 186–189. This publication states inter alia that it is necessary to ensure that not too much of the light reflected and modulated at the plate surface can return to the laser. As a matter of fact, this feedback coupling could cause undesired fluctuations in the output power of the laser.

Stray light reflected at components of the device, for example, the coupling-out mirror, may interfere with the primary beam at the area of the detector and thus give rise to very deep modulation of the detector signal.

Such fluctuations of the output power and modulation are in many cases undesired, also in the case of other applications, for example interferometers.

A pending U.S. patent application Ser. No. 804,887 filed June 9, 1977, which is a continuation application of Ser. No. 625,182 filed Oct. 23, 1975, now abandoned, discloses that by providing a radiation-attenuating element in the radiation path of the read-out beam of a reading device of the king described in the second paragraph, the accidental intensity modulations in the read-out beam, which modulations are the result of undesired reflections in the radiation path, can be considerably reduced. The radiation-attenuating element is preferably provided on the substrate of the coupling-out mirror in the form of an absorption filter. However, it has been found that this measure is not optimum, while in addition much power is lost.

It is therefore an object of the invention to provide a gas discharge laser in which undesired fluctuations in the output power and undesired modulations are substantially prevented and the outside of the coupling-out mirror has a very small reflection of stray light, while the reflection on the inside of the coupling-out mirror generally even increases slightly and the loss of power is minimum.

For that purpose the gas discharge laser according to the invention is characterized in that the multilayer mirror through which the laser beam, generated by the gas discharge laser, leaves the laser, the so-called coupling-out mirror, has a radiation-attenuating film element which is incorporated between the layers, at least one and at most five layers being situated between the radiation-attenuating film and the substrate.

The invention is based on the recognition of the fact that in this manner a resonant cavity is created in the multilayer mirror, in which cavity the reflected-stray light is trapped and attenuated by the radiation-attenuating film so as to provide a mirror with an asymmetrical characteristic.

A preferred embodiment of such a gas discharge laser according to the invention is one in which a layer having a high complex index of refraction, a layer having a low complex index of refraction, the radiation-attenuating film, a layer having a low complex index of refraction and a number of layers having alternately a high and a low complex index of refraction are successively provided on the substrate of the coupling-out mirror.

The radiation-attenuating film is preferably a metal film having an optical thickness between $0.01\lambda$ and $0.03\lambda$, $\lambda$ being the wave-length of the generated laser light. However, it may also be a film of a cermet. Optimum results were achieved with a metal film having an optical thickness of $0.02\lambda$.

Such a metal film may preferably be composed of one or more metals from the group Ti, Ag, Cr, Al, Mg, Ni.

A gas discharge laser of the kind described is particularly suitable for use in a device for reading a record carrier as described in the second paragraph because the said fluctuations and modulations which occur without using the invention would make good operation difficult.

The invention will now be described in greater detail with reference to the drawing, in which:

FIG. 1 shows diagrammatically a gas discharge laser according to the invention,

FIG. 2 shows a diagram of a known 21-layer mirror,

FIG. 3 shows a preferred embodiment of a coupling-out mirror according to the invention, and FIG. 4 shows a use of the gas discharge laser in a device for reading record carriers.

FIG. 1 shows diagrammatically a gas discharge laser according to the invention. Multilayer mirrors 2 and 3 are directly secured to the preferably cylindrical part of the gas discharge tube which forms the laser tube 1 by means of a two-components cement 26. Said multilayer mirrors 2 and 3 consist of substrates 4 and 5 on which multi-layer assemblies 6 and 7 are provided, for example by vapor-deposition. By means of the electrodes 24 and 25 positioned in lateral tubes, a discharge is generated in the laser tube. A laser beam is obtained by stimulated emission and leaves the laser via the coupling-out mirror 3. The described laser has the following laser parameters.

Length of laser tube approximately: 250 mm
Length of active discharge approximately: 205 mm
current through the discharge: 6.4 mA
inside diameter of laser tube approximately: 1.8 mm
gas filling: 15% Ne, 85% He
gas pressure: 2.3 Torr
resonator configuration: nearly hemispherical
output power: 1-2 mWatt at 6328Å

It will be obvious that the invention is not restricted to He-Ne lasers of the abovedescribed lateral tube type, but that it may also be used in so-called coaxial lasers and in known lasers in which the multi-layer mirrors of the resonator are positioned at some distance from the laser tube which is sealed by means of Brewster-windows.

FIG. 2 is a schematic diagram of a known 21-layer mirror. The first layer 9 on the glass substrate (S) 8 is in general a layer having a high complex index of refraction (H). The subsequent layers have alternately a low (L) and a high (H) complex index of refraction. Since the last layer generally has a high complex index of refraction, it follows that such reflectors often consist of an odd number of layers. Glass or quartz substrates are frequently used. When two parallel surfaces 10 and 11 are considered and the requirement exists that the light rays reflected at said surfaces must be in phase so as to intensify each other by interference, the optical thickness of layer 12 must preferably be a quarter of the wavelength in the relevant layer. When a great number of layers are used, the successive surfaces will reflect light and each reflection will intensify the preceding reflection. The maximum number of layers is determined by the absorption and scattering in the material of the layers. A short hand notation to denote such a 21-layer-mirror is $S(HL)^{10}H$, where S is the substrate, H is the layers having a high complex index of refraction and L is the layers having a low complex index of refraction. In this case the layers having a high complex index of refraction consist of $TiO_2$ and those having a low complex index of refraction consist of $SiO_2$ and the layers have an optical thickness which is a quarter of the wavelength of the light of a He-Ne laser, namely n.d = $\frac{1}{4}$·6328Å, where n is the index of refraction of the material of the relevant layer and d is the mechanical thickness.

FIG. 3 shows a preferred embodiment of a coupling-out mirror for a gas discharge laser according to the invention. Provided on a glass substrate (S) 8 is a first layer of $TiO_2$ having a high complex index of refraction (H). On said first layer are provided two $SiO_2$ layers having a low complex index of refraction (L) and which are separated from each other by a Ti-film 13 (LML). The latter is followed by a packet of layers of the usual composition. The $TiO_2$ and $SiO_2$ layers in the vicinity of the Ti-film have an optical thickness such that, viewed from the substrate side, the optical impedance is adapted so that a minimum reflection occurs from the substrate side. The Ti-film has an optical thickness of 0.02λ, λ being again the wavelength of the laser light. The complex index of refraction of the said metals suitable for the metal film differ mutually so that, in order to adapt the optical impedance in the vicinity of the metal film, the layers which are positioned in the vicinity of the metal film have an optical thickness which, dependent on the complex index of refraction of the metal used, differs considerably. The two $SiO_2$-layers separated from each other by the Ti-film together constitute a resonant cavity in which the light returned via the substrate is trapped and attenuated. As a result, the reflection of the coupling-out mirror from the outside decreases considerably (for by a factor 10) while the transmission through the multilayer mirror decreases only slightly (less than 20%) and, as follows from calculations, the inside reflection even increases slightly.

The radiation-attenuating element according to the aforesaid U.S. patent application Ser. No. 804,887 of prior date is an absorption filter which attenuates, for example, up to 30%. So a modulation depth m is attenuated to 0.3 m. The power V is attenuated proportionally to 0.3 V. The attenuation with the coupling-out mirror according to the invention is proportional to $(R)^{\frac{1}{2}}$, where R is the coefficient of intensity reflection. In the example described this is approximately 10%. Without the use of the invention, the reflection is nearly 100% and decreases by a factor of 10 from the substrate side by using the invention. So a modulation depth m is attenuated to approximately 0.3 m, while the power V decreases by 20% and thus becomes 0.8 V. Hence with a coupling-out mirror according to the invention a low reflection from the substrate side is obtained with a comparatively small loss of power.

FIG. 4 shows diagrammatically a device for reading a record carrier on which information, for example video and/or audio information, is provided in an optically readable information structure or pattern and in which a gas discharge laser of the kind described in the preceding paragraph provides great advantages. This Figure is a sectional view through a circular/disc-shaped record carrier 14 which is provided with information tracks 15. The record carrier is exposed to radiation originating from a He-Ne laser 16. The read-out beam 17 is focused by the objective 18 on the plane of the information tracks to a small radiation spot 20 in the order of magnitude of the information details in the information structure. The auxiliary lens 19 ensures that the pupil of the objective is filled. The read-out beam is reflected by the information structure and traverses the objective 18 for a second time and is reproduced on the detector 21. A transverse magnetic field in the laser ensures that the emanating laser beam is linearly polarized parallel to said magnetic field. As a result, a separation of the incident light and the reflected light can be obtained by means of a $\frac{1}{4}\lambda$ plate 22 and a polarising mirror 23. However, this separation is not completely effective, so that some light nevertheless returns to the laser. As already stated, it is necessary to ensure that not too much of the light which is reflected at the optical elements and at the surface of the record carrier 14, and hence is modulated, can return to the laser and be reflected again into the device by the coupling-out mirror. This may be done by using a gas discharge laser according to the invention. Such gas discharge lasers are also particularly suitable for use in interferometers because in that case too fluctuations and modulations in the laser beam are not desired.

What is claimed is:

1. A gas discharge laser comprising a laser tube having a longitudinal bore sealed at either end and filled with a gas in which an active laser medium is incorporated, said laser medium being activated in an optical resonator which is formed from at least two spaced apart multilayer mirrors each composed of a substrate on which are provided a number of layers having a high and a low index of refraction, one of said multilayer mirrors comprising the coupling-out mirror through which the laser beam generated by the gas discharge laser leaves the laser, and a radiation-attenuating film element incorporated between a pair of layers of the coupling-out mirror, at least one and at most five layers being situated between the radiation-attenuating film element and the substrate.

2. A gas discharge laser as claimed in claim 1 wherein the multilayer mirror is formed so that a layer having a high complex index of refraction, a layer having a low complex index of refraction, the radiation-attenuating film element, a layer having a low complex index of refraction and a number of layers having alternately a high and a low complex index of refraction are successively provided on the substrate of the multilayer coupling-out mirror.

3. A gas discharge laser as claimed in claim 1 wherein the radiation-attenuating film element comprises a metal film having an optical thickness between $0.01\lambda$ and $0.03\lambda$; $\lambda$ being the wavelength of the generated laser light.

4. A gas discharge laser as claimed in claim 2 wherein the radiation-attenuating film element comprises a metal film having an optical thickness of $0.02\lambda$, where $\lambda$ is the wavelength of the generated laser light.

5. A gas discharge laser as claimed in claim 3, characterized in that the metal film is composed of one or more metals selected from the group consisting of Ti, Ag, Cr, Al, Mg, and Ni.

6. A gas discharge laser as claimed in claim 1 wherein said radiation-attenuating film element is sandwiched between adjacent layers each of which has a low index of refraction.

7. A gas discharge laser as claimed in claim 2 wherein the radiation-attenuating film element comprises a metal film having an optical thickness between $0.01\lambda$ and $0.03\lambda$, where $\lambda$ is the wavelength of the generated laser light beam.

8. A gas discharge laser comprising a tube sealed at each end and filled with a gas incorporating an active laser medium, said tube including at least two spaced apart multilayer mirrors forming an optical resonator in which the laser medium is activated, each of said mirrors comprising a substrate on which are formed a plurality of alternate dielectric layers of different indices of refraction, one of said multilayer mirros comprising the coupling-out mirror by means of which the generated laser beam leaves the tube, and a radiation-attenuating film element located between and separating a pair of adjacent layers of the coupling-out mirror to provide a mirror with asymmetrical optical properties, at least one and at most five dielectric layers being located between the radiation-attenuating film element and the mirror substrate.

9. A gas discharge laser as claimed in claim 8 wherein the radiation-attenuating film element is sandwiched between adjacent dielectric layers each of which has a low index of refraction.

10. A gas discharge laser as claimed in claim 9 wherein said alternate dielectric layers comprise successive layers of high and low indices of refraction.

11. A gas discharge laser as claimed in claim 10 wherein the radiation-attenuating film element comprises a metal film having an optical thickness between $0.01\lambda$ and $0.03\lambda$, where $\lambda$ is the wavelength of the generated laser light beam.

12. A gas discharge laser as claimed in claim 8 wherein said alternate dielectric layers comprise successive layers of high and low indices of refraction.

13. A gas discharge laser as claimed in claim 12 wherein the radiation-attenuating film element comprises a metal film having an optical thickness between $0.01\lambda$ and $0.03\lambda$, where $\lambda$ is the wavelength of the generated laser light beam.

14. A gas discharge laser as claimed in claim 12 wherein said high and low layers in the vicinity of the film element have an optical thickness such that, viewed from the substrate side, the optical impedance allows a minimum reflection of light coming from the substrate.

* * * * *